Patented Mar. 14, 1939

2,150,166

UNITED STATES PATENT OFFICE 2,150,166

SILICON CARBIDE PRODUCT AND METHOD OF MAKING THE SAME

Otis Hutchins, Niagara Falls, N. Y., assignor, by mesne assignments, to The Carborundum Company, Niagara Falls, N. Y., a corporation of Delaware No Drawing. Application September 23, 1935, Serial No. 41,833

8 Claims. (Cl. 51—278)

My invention is a new article of manufacture comprising granules having a core of silicon carbide and an integral surface coating high in true silica and low in carbon, and the method of making such product.

The product consists of discrete or non-agglomerated granules whose crystalline cores of silicon carbide have their surfaces partially or completely covered with a layer or coating containing a metallic oxide, which is preferably porous and consists primarily of silica but which may also include small amounts of oxide of iron or alumina, as well as a small amount of free carbon. Under the microscope, this porous surface has somewhat the appearance of the surface of coke, being dull and dark in color, with little or no light reflecting or refracting capacity, and lacking the iridescent, vitreous or glassy characteristics of pure silicon carbide crystals or silicon carbide which have been cleaned by roasting.

This thin, mat, surface-coating, integral with the silicon carbide cores, results from the disintegration or decomposition of a portion of the crystalline structure and the elimination of a portion of the carbon liberated thereby. The liberation and conversion of the silicon into true silica is effected by oxidation, and preferably by roasting non-agglomerated granules of silicon carbide under oxidizing conditions in the presence of a substance accelerating the formation of silica through the oxidation of the surface of the silicon carbide. The accelerating substance used is preferably a readily reducible metallic oxide, such as iron oxide, lead oxide or nickel oxide. The accelerating substance is preferably intimately mixed with the silicon carbide prior to roasting and the mixture is thoroughly agitated, as by tumbling, during the roasting operation.

The true silica content on the surface of grain treated in accordance with my invention may be varied within relatively wide limits, but it is preferably between one-half of one percent and five percent, but I have found it generally desirable that the true silica content should be such as to give a rough or uneven surface by reason of the pitting thereof or the formation of lumps of fused silica thereon. This roughness and coating of silica greatly improves the bond obtainable between the granules and ceramic, resinous, rubber or glue binders. Where the treatment is carried on until the silica content exceeds 3%, there is a tendency for the dull, porous surface to slag and become glassy. Granules, having a surface silica content of the order of 1.75% in a porous form, are very desirable for certain purposes more fully set out in the joint application of John Robert McFarlin and myself filed September 23, 1935, and bearing the Serial No. 41,834. For such use, free carbon preferably should not exceed five hundredths of one percent, and in some grain embodying my invention I have reduced the free carbon content as low as 1/100 of one percent with advantageous results.

In the preferred practice of my invention, the silicon carbide as taken from the furnace is crushed so as to separate the agglomerated masses into discrete grains or granules. The discrete grains or silicon carbide crystals are then intimately mixed with an oxidation accelerator, preferably .3% to .8% by weight of ferric oxide of a high degree of purity. Should the granules contain iron oxide as an impurity, the quantity of accelerating agent may be reduced proportionately. The intimate mixture of the silicon carbide granules and oxidation accelerator, and the adhesion of the accelerator to the surfaces of the silicon carbide granules, may be effected by mixing the grains and accelerating agent, together with a little water in a concrete mixer for from fifteen to thirty minutes when a sharp grain is desired. When a mulled grain is desired, the grains and accelerator may be rotated together in a slowly revolving ball mill or tube mill for about thirty minutes, or the grain and accelerator may be mixed in a pan mill for about thirty to sixty minutes or until the edges are sufficiently dulled. The thoroughly mixed grain and accelerating agent are then roasted in a rotary kiln under oxidizing conditions. I have found that the amount of oxidation accelerator required to be mixed with the silicon carbide varies somewhat according to the amount of oxidation desired: to the length of time the mixture is subjected to the roasting treatment: and to the amount of accelerator that may be present in or on the silicon carbide as an impurity. In order to produce a final product having a silica content of 1.5% or more, when the roasting is carried on at a temperature of from 1100° C. to 1300° C. for about thirty minutes there should be present with the silicon carbide granules a total of .3% to .8% of ferric oxide, including that present as an impurity on the granules.

The rotation of the kiln tumbles the granules and keeps them in constant agitation thereby facilitating the uniformity of the oxidation of the silicon carbide crystals at the surfaces of the granules and by the agitation during the roasting treatment, there is obtained a type of silicon carbide not hitherto obtained. The ordinary smooth, glassy and iridescent surfaces of the silicon carbide granules become pitted or etched to form a layer containing a high percentage of true silica, which is an integral part of the granules. When roasted under the conditions outlined, the oxidized portions of the surfaces are dull, porous and non-iridescent and the entire surfaces are low in carbon. If roasting of the granules is carried on with an excess of oxidation accelerator or at a higher temperature, a surface coating higher in true silica and low in carbon may be obtained, but parts of such surface may be iridescent and show an appearance of slagging. This grain is less useful for some purposes than grain treated in the preferred manner, though more useful for certain other purposes.

The grain after being subjected to the roasting treatment is washed with acid, such as sulphuric acid, and passed through a magnetic separator. These treatments remove undesirable impurities, such as residual oxidizing accelerator and magnetic materials.

The grain treated in accordance with and embodying my invention is superior to ordinary silicon carbide grain for many purposes, such, for instance, as in abrasive articles, as well as for its electrical characteristics set out in the joint application above referred to.

In determining the true silica content, a sample of grain may be tested with hydrofluoric acid to ascertain the total metallic silicon and silica attached to the surface of the grain, and the metallic surface silicon may be determined by a silver salts analysis of a second sample. By subtracting the surface silicon from the total silica and silicon, the true silica is determined.

Having described my invention, I claim:

1. The method of coating silicon carbide granules with silica comprising coating such granules with a metallic oxide, roasting and tumbling such granules until the surfaces thereof are converted into mat layers containing silica in amount greater than one percent of the weight of the granules and a low percentage of carbon, washing the granules with acid, and subjecting the granules to magnetic force to remove magnetic particles therefrom whereby there is formed a mass of loose silicon carbide granules each of which has a surface coating of silica integrally united thereto.

2. As a new manufacture, a mass of loose grains of silicon carbide each of which has an integrally united and substantially uniformly distributed surface coating of silica amounting to more than 1% of the total weight of the coated grain.

3. As a new manufacture, a mass of loose grains of silicon carbide each of which has an integrally united and substantially uniformly distributed surface coating of silica amounting to approximately 1.75% of the total weight of the coated grain.

4. As a new manufacture, a mass of loose grains of silicon carbide each of which has an integrally united and substantially uniformly distributed surface coating of silica amounting to approximately 1.75% of the total weight of the coated grain, the free carbon content of said mass being not more than .05% of the weight of the mass.

5. As a new manufacture, a mass of loose grains of silicon carbide each of which has an integrally united and substantially uniformly distributed surface coating of silica amounting to more than 1% of the total weight of the coated grain, the free carbon content of said mass being not more than .05% of the weight of the mass.

6. The method of coating silicon carbide granules with silica comprising roasting and agitating said granules under oxidizing conditions in the presence of iron oxide distributed throughout the mass of granules, the said roasting being carried on at a temperature and for a period of time sufficient to oxidize the surfaces of said silicon carbide granules, whereby there is formed a mass of loose silicon carbide granules each of which has a surface coating of silica integrally united thereto.

7. The method of coating silicon carbide granules with silica comprising roasting and agitating said granules under oxidizing conditions in the presence of ferric oxide distributed throughout the mass of granules, the said roasting being carried on at a temperature and for a period of time sufficient to oxidize the surfaces of said silicon carbide granules, whereby there is formed a mass of loose silicon carbide granules each of which has a surface coating of silica integrally united thereto.

8. The method of coating silicon carbide granules with silica comprising roasting and agitating said granules under oxidizing conditions in the presence of an oxidation catalyst distributed throughout the mass of granules, the said roasting being carried on at a temperature and for a period of time sufficient to oxidize the surfaces of said silicon carbide granules, whereby there is formed a mass of loose silicon carbide granules each of which has a surface coating of silica integrally united thereto.

OTIS HUTCHINS.